Aug. 19, 1969    R. E. LEWIS    3,462,181

JOINT STRUCTURE

Filed April 3, 1967

INVENTOR.
ROBERT E. LEWIS
BY
Woodhams, Blanchard & Flynn
ATTORNEYS

United States Patent Office 3,462,181
Patented Aug. 19, 1969

3,462,181
JOINT STRUCTURE
Robert E. Lewis, White Pigeon Township, St. Joseph County, Mich., assignor to L & T Machine Products, Inc., Centreville, Mich., a corporation of Michigan
Filed Apr. 3, 1967, Ser. No. 627,900
Int. Cl. F16b 1/00; E04c 1/10, 1/30
U.S. Cl. 287—189.36                                    7 Claims

ABSTRACT OF THE DISCLOSURE

A joint for interconnecting first and second members or opposite ends of the same member, said joint having a tongue and groove connection for releasably interconnecting the members and preventing relative movement thereof in a direction transverse to the axis of said groove. The members also having interfitting teeth integrally formed thereon for preventing relative movement thereof in a direction parallel to the groove axis. The tongue and groove and the interfitting teeth are integrally formed on the members to permit rapid and inexpensive manufacture and assembly while providing a joint having high strength and durability.

---

This invention relates to a joint for interconnecting two members or opposite ends of the same member, the joint being of the so-called tongue-and-groove type, and additionally having means for interlocking the members to prevent relative movement thereof in a direction parallel to the longitudinal axis of the tongue-and-groove connection.

The interconnection of two members or opposite ends of the same member by means of a joint utilizing a tongue-and-groove type of connection is old and well known in the art. These joints are very desirable in that they have a high load-carrying capacity and great durability when the forces which act thereon are applied transversely of the groove. However, these joints are not completely satisfactory for use in situations when forces are applied thereon in directions parallel to the longitudinal axis of the groove. Such axial loads tend to cause the tongue member to slide axially within the groove and thus cause a separation of the joint parts.

To overcome axial slippage between the tongue and groove due to loads applied thereon parallel to the groove axis, many joints have employed a secondary locking means for interconnecting the members against movement in a direction parallel to the groove axis. Such secondary locking means have often taken the form of a set screw or locking pin passed through the two joint parts for interconnecting the same. In many situations these secondary locking means have proven ineffective in restraining the relative axial movement between the tongue and the grooved member. Also, these structures are more expensive to manufacture since they require a greater number of parts in the over-all joint structure.

Furthermore, most prior tongue-and-groove joints which utilized a secondary locking means for preventing relative axial movement between the tongue and the groove have employed a separate or independent third member for performing such a locking function. However, the use of such an independent third member is undesirable because it often makes assembly of the joint more difficult and often results in a less dependable joint structure.

Further, it has been found desirable in some situations to wrap a flexible band or ring member around the periphery of a pipe or similar object, with the ends of the band being interconnected or joined so as to fixedly position the band on the external periphery of the pipe. Prior art attempts to successfully and easily connect the ends of the band while positioned around the periphery of the pipe have not been completely satisfactory because the joint structure has lacked the necessary flexibility and simplicity to permit the joint to be integrally formed on the ends of the band. Furthermore, the prior art joints used in this environment have not successfully provided means for locking the joint parts against relative movement in directions both parallel to and transverse to the groove axis. The prior art joints which have been able to do this have been very complicated and cumbersome and have not permitted the joint to be rapidly and easily interconnected while working in the field.

Accordingly, the objects of the invention include:

(1) To provide a joint having great durability and flexibility and capable of withstanding substantial loads applied both parallel to and transverse to the longitudinal axis of the joint.

(2) To provide a joint, as aforesaid, including a tongue-and-groove type of interconnection so that the joint is capable of withstanding substantial forces applied in a direction transverse to the groove axis without separation of the joint parts occurring.

(3) To provide a joint, as aforesaid, which also includes a second joint locking means so that the joint is capable of withstanding substantial forces applied in a direction parallel to the groove axis without permitting separation of the joint parts.

(4) To provide a joint, as aforesaid, in which the second locking means includes interfitting teeth aligned in abutting relationship in a direction parallel to the longitudinal axis of the groove.

(5) To provide a joint, as aforesaid, in which the parts to be joined have the tongue and groove respectively formed thereon, and also have integrally formed thereon the teeth members of the second locking means.

(6) To provide a joint, as aforesaid, in which the parts to be joined are formed of a flexible material so as to permit rapid and efficient assembly of the joint.

(7) To provide a joint, as aforesaid, which will have substantial durability and will require no maintenance.

(8) To provide a joint, as aforesaid, which can be integrally manufactured by shaping the ends of a band, which band can be wrapped around an object, such as a pipe, and then affixed to said pipe by means of said joint, the joint being capable of being rapidly assembled without requiring any expensive tools or equipment.

(9) To provide a joint, as aforesaid, which can be produced at a relatively low cost.

Other objects and purposes of the invention will be apparent to persons acquainted with devices of this general type upon reading the following disclosure and inspecting the accompanying drawings.

Figure 1:
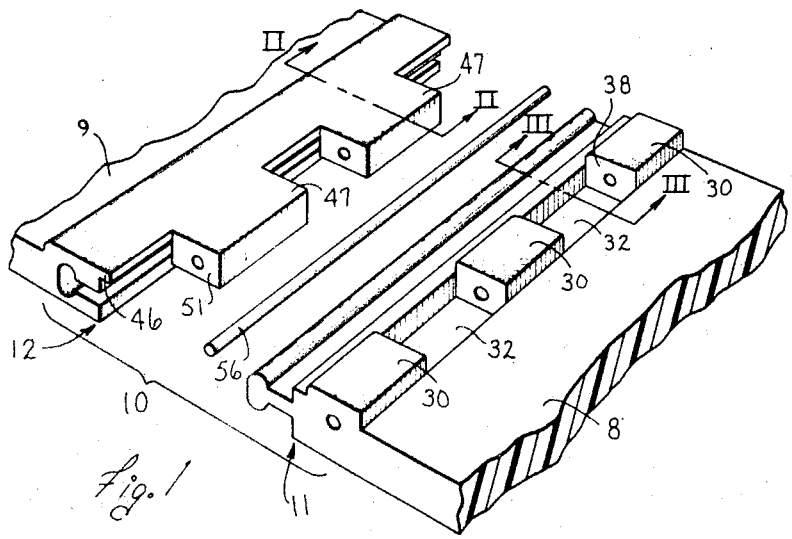
FIGURE 1 is a perspective view showing the joint parts in a disassembled relationship.

Certain terminology will be used in the following description for convenience in description only, and will not be limiting. The words "upwardly," "downwardly," "rightwardly" and "leftwardly" will designate directions in the drawings to which reference is made. The word "axially" will refer to a direction parallel to the longitudinal axis of the groove and the word "transversely" will refer to the direction perpendicular to the groove axis. The words "inwardly" and "outwardly" will refer to directions toward and away from, respectively, the geometric center of the joint and designated parts thereof. Said terminology will include the words above specifically mentioned, derivatives thereof, and words of similar import.

Summary of the invention

In general the invention comprises a joint for interconnecting first and second members or for interconnecting opposite ends of a flexible band or ring member. The parts to be joined are each formed along adjacent edges thereof with joint means whereby the members can be rigidly interconnected so as to prevent relative movement between the two parts in any direction. The adjacent edges are formed with an integral tongue and groove, respectively, which tongue and groove are capable of interconnecting the parts so as to restrain same against movement in a direction transverse to said edges. Spaced teeth members are also integrally formed on said edges adjacent the tongue-and-groove joint, the teeth of the respective parts interfitting between each other in an axially aligned, abutting relationship so as to prevent relative movement between the parts in a direction parallel to said edges. A pin member extends through holes formed in the respective teeth so as to rigidly interconnect the same, thus preventing joint separation as a result of relative twisting movement of the two parts. The two parts to be joined are each formed of a flexible material with the teeth and the tongue and groove being integrally formed thereon whereby the flexibility of the members permits the interconnection between the tongue and groove and the teeth members to be readily accomplished by hand without requiring the use of additional tools or equipment and results in a durable joint which is locked against relative movement and separation in any direction.

Detailed description

Referring now to the drawings, FIGURE 1 shows a perspective disassembled view of the joint which is comprised of first and second joint parts 8 and 9 which are adapted to be fixedly secured to each other by means of a joint pin 56. The tongue-and-groove section of the joint for interconnecting the parts is comprised of a tongue portion, indicated generally at 11, and a groove portion, indicated generally at 12, the tongue-and-groove portions 11 and 12 being integral with the first and second parts 8 and 9, respectively.

Figures 2, 3:
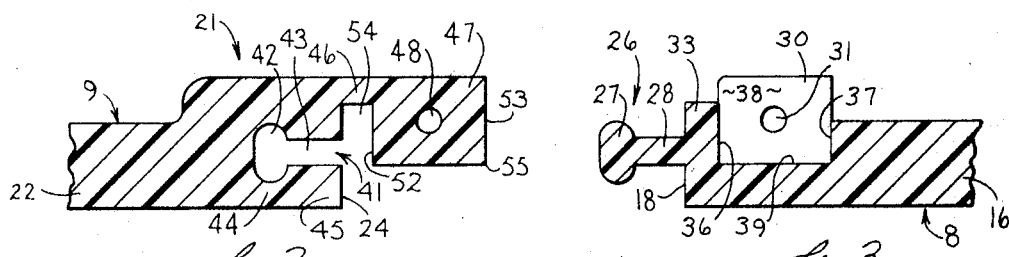
FIGURE 2 is a sectional view, on an enlarged scale, taken along the line II—II of FIGURE 1.
FIGURE 3 is a sectional view, on an enlarged scale, taken along the line III—III of FIGURE 1.

As shown in FIGURE 3, the first part 8 is generally formed as a flat strip or sheet member 16. The part 8 has an edge 18. The second part 9 is similarly made of a flat sheet or strip 22. The part 9 has an edge 24 which is opposed to the edge 18. The first and second parts 8 and 9 need not be of flat shape, but could be of any shape or configuration desired.

Considering now the tongue portion 11 (FIGURES 1 and 3), the first part 8 has an integral tongue 26 thereon, the tongue 26 being comprised of an enlarged head portion 27 interconnected with the edge 18 by means of a web 28. The tongue 26 projects toward the part 9 and extends longitudinally along the entire length of the edge 18 as shown in FIGURE 1. The head 27 is preferably of an arcuate, such as oval, cross-sectional configuration to permit the tongue to be readily assembled within its mating groove.

A plurality of longitudinally spaced-apart blocks or teeth members 30, which are generally rectangular in plan view, are integrally formed on the first part 8 adjacent the edge 18 and said teeth members project above the upper surface of the part 8. The blocks 30 are formed with coaxial openings 31 therein, the axis of the openings 31 being parallel to the tongue 26. A series of depressions 32 are formed in the upper surface of the part 8 and said depressions are alternately arranged with the teeth members 30. The depressions 32 are of a generally rectangular shape and are bounded on opposite ends thereof by the end surfaces 38 of the adjacent teeth members 30. The depressions 32 extend partway through the part 8 and are additionally bounded by the side walls 36 and 37, formed on the part 8, and by a bottom wall 39. The side wall 36 is provided by an upstanding lip portion 33 which extends along the edge 18 adjacent the block members 30 and the depressions 32.

The groove portion 12 shown in FIGURE 2 has a groove 41 extending along the longitudinal edge 24 thereof, the groove being of a configuration complementary to that of the tongue 26. In particular, the groove 41 is comprised of an enlarged opening 42 of a generally arcuate, such as oval, cross-sectional shape, which shape basically conforms to the external periphery of the head 27. The opening 42 is interconnected with the edge 24 by means of a slot 43 so as to permit access to the opening 42. The opening 42 results in the formation of a section 44 of reduced thickness which reduced section enables the lip portion 45 to have a limited amount of flexibility relative to the remainder of the part 9.

The part 9 formed with an enlargement 21, the enlargement being provided so as to accommodate the enlarged opening 42 therethrough. The enlargement 21 is additionally provided with a flange 46 extending laterally therefrom along the entire length of the edge 24. A plurality of blocks or teeth members 47 are integrally connected to the flange 46 in spaced axial relationship as is clearly shown in FIGURE 1. Each of the blocks 47 are provided with coaxially aligned openings 48 therethrough, the axis of the openings 48 being parallel to the groove 42.

The blocks 47 integrally formed on the second part 9 are positioned so as to be directly aligned with the depressions 32 formed within the first part 8 when the first and second part 8 and 9 are properly aligned with respect to each other for interconnecting the same. Likewise, when the first and second parts are properly aligned the block members 30 formed on the first part 8 are directly aligned with the openings or spaces which separate the block members 47 formed on the second part 9. The blocks 47 are of a slightly smaller size than the depressions 32 so as to freely but snugly interfit therein. In particular, the blocks 47 are provided with end faces 51, which end faces abut the respective end faces 38 of the adjacent block members 30 when in an assembled relationship. Also, the block members 47 have opposed surfaces 52 and 53 thereon, which surfaces are positioned adjacent the surfaces 36 and 37, respectively, formed on the first part 8. As is shown in FIGURE 2, the side wall surface 52 and edge 24 cooperate with the lower surface of the flange 46 to define a channel or opening 54 therebetween, which channel receives therein the lip portion 33 of the first part 8 when the first and second parts are joined together.

When the joint has been assembled, the tongue 26 will be received within the groove 41 and the teeth members 47 will be received within the depressions 32. In this relationship, the openings 48 formed within the block members 47 will be coaxially aligned with the openings 31 formed with block members 30. A pin 56 is then slideably inserted through the openings 31 and 48 so as to fixedly interconnect the block members 30 and 47 and their respective first and second parts 8 and 9. The pin 56 thus prevents the block members 47 and 30 from separating due to relative pivotal movement between the first and second parts about the longitudinal axis of the groove.

The joint parts 8 and 9 described above are generally formed of a flexible material, preferably of a relatively stiff plastic or rubber. The use of such a flexible material permits the tongue and groove and the interfitting teeth to be integrally formed on the parts 8 and 9 by molding and thus results in a very inexpensive manufacturing operation.

Operation

Although somewhat indicated above, the operation of the joint of the invention hereinabove described will now be discussed to insure a complete understanding thereof.

When it is desired to assemble or interconnect the parts 8 and 9 by means of the joint 10, the parts 8 and 9 are aligned with the end faces 18 and 24 facing each other as illustrated in FIGURE 1. The tongue 26 is positioned beneath the teeth members 47 such that the head 27 of the tongue is located adjacent the opening of the slot 43 formed within the edge 24. The members 8 and 9 are then forcibly pushed together whereby the head portion 27 causes the lip portion 45 of the lower plate 22 to be flexed downwardly about the reduced section 44. The downward flexing of the lip portion 45 permits the head 27 to be forced through the slot 43 into the enlarged opening 42. After the head 27 has been received within the enlarged opening 42, the edge portion 45 flexes upwardly whereby the head 27 is snugly held within the opening 42.

While the parts 8 and 9 are being pushed toward each other so as to accomplish the above tongue-and-groove connection, the edge 55 of the teeth members 47 come into contact with the lip portion 33 whereby the teeth 47 are flexed upwardly about the flange 46. Continued inward movement of the parts 8 and 9 relative to each other causes the lower surface of the teeth members 47 to ride over the lip portion 33 until the teeth come into registration with the depressions 32 whereupon the resiliency of the material causes the teeth 47 to flex downwardly about the flange 46 into the depressions 32. The side wall 52 of the teeth 47 bear against the side wall 36 of the lip portion 33 so as to prevent transverse separation of the parts 8 and 9.

When the block members 47 have been received within the depressions 32, the upper surfaces of the teeth 30 and 47 are respectively flush with each other and the openings 31 and 48 contained therein are coaxially aligned. Pin 56 is then slideably inserted through the openings 31 and 48 so as to fixedly interconnect the teeth 30 and 47. The pin 56 thus prevents separation of the teeth 30 and 47 due to relative pivotal movement therebetween. Furthermore, relative axial movement between the teeth 30 and 47 is prevented due to the length of the teeth 47 being substantially equal to the length of the depressions 32 such that the end faces 51 of the teeth 47 substantially abut the faces 38 of the adjacent teeth 30.

The above joint in its assembled condition thus results in a joint structure which is able to withstand and transmit a substantial force both transversely to and axially along the joint without causing joint failure or separation. When forces are applied so as to cause the parts 8 and 9 to move toward each other in a direction transverse to the groove axis, the head 27 bears against the rear surface of the opening 42 and thus the joint has a high load capacity. Furthermore, when loads are imposed on the joint which tends to separate the parts 8 and 9 in a direction transverse to the groove axis, the other side of the head 27 bears against the front side of the opening 42 adjacent the slot 43. However, since such a load would tend to flex the lip portion 45 downward and cause separation of the joint, this undesirable result is prevented by means of the interengagement between the side wall 52 formed on the teeth 47 and the side wall 36 formed on the lip portion 33. Forces tending to separate the members 8 and 9 thus cause these side walls to come into abutting contact and thus prevent separation of the members. Furthermore, the teeth 47 are prevented from flexing upwardly so as to cause separation by means of the pin 56. When loads are imposed axially along the groove, the members 8 and 9 are prevented from separating by means of the interfitting teeth 30 and 47, respectively, which teeth are positioned so as to have their respective end faces 38 and 51 closely adjacent each other in abutting relationship so as to prevent relative axial movement therebetween. Further, the pin 56 prevent separation of the joint due to any accidental relative rotational movement which might occur between the parts 8 and 9, the relative rotational movement being imposed about the longitudinal axis of the slot.

Modification

Figure 4:
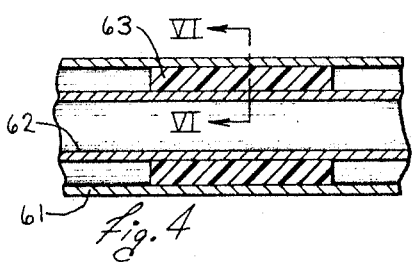
FIGURE 4 is a cross-sectional view illustrating an environmental use of the improved joint.
Figure 5:
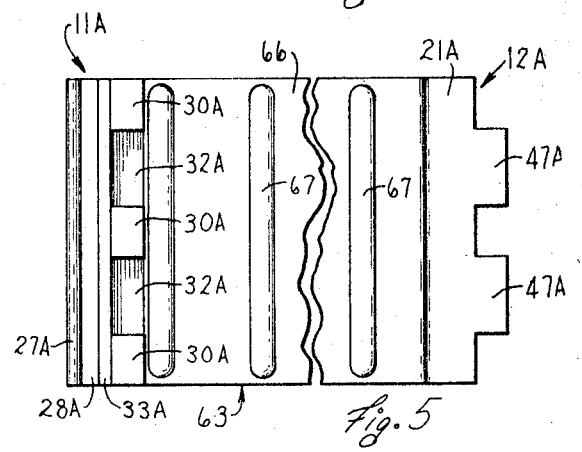
FIGURE 5 is a broken, top view of a flexible band member with the joint being formed integrally on the ends thereof.
Figure 6:
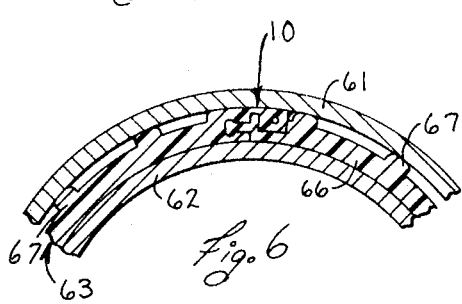
FIGURE 6 is a cross-sectional view, on an enlarged scale, taken along the line VI—VI of FIGURE 4.

FIGURES 4–6 illustrate a modification wherein the joint structure described in detail above is integrally formed on a one-piece flexible band or ring member. Since the joint structure is identical with that described above, corresponding parts have been designated by the same reference numerals as utilized above with the suffix "A" added thereto.

FIGURE 4 illustrates outer and inner pipe members 61 and 62, respectively, separated by an insulating band or ring 63. Such a situation as is illustrated in FIGURE 4 is often encountered when it is desired to insert a new pipe within an older pipe which is no longer capable of transmitting fluid or material therethrough, the older pipe being buried underground so that insertion of a new pipe therewithin thus restores the pipeline facilities without requiring the digging of a new trench and the laying of a new pipe. However, the new pipe 62 must generally be insulated from the old pipe 61 by means of insulating bands or rings so as to result in long life thereof.

It has been found that the joint of the present invention is particularly well adapted for use on insulating rings when used in an environment as described and shown in FIGURE 4. Such a ring is rapidly and inexpensively fabricated and assembled and is able to withstand a substantial, external load without causing joint separation as the inner pipe is being inserted and pushed into the outer pipe.

The insulating band 63 is shown in a flat or unrolled condition in FIGURE 5 and comprises an essentially flat sheet or plate member 66 having a tongue portion 11A and a groove portion 12A formed on opposite ends thereof. The tongue portion 11A is integrally formed with the body portion 66 and has a head member 27A attached to the edge thereof by means of a flange 28A. The teeth 30A are formed on the upper surface of the body member 66 and have recesses located therebetween.

The other end of the body portion 66 has grooved portion 12A formed integrally thereon, which portion has teeth 47A integrally formed thereon for engagement with the recesses 32A. A groove (not shown) is formed within the end of the body portion 66 in substantially the same manner as is illustrated in FIGURE 2. A plurality of ribs 67 is formed on the body portion 66 intermediate the ends thereof. The ribs 67 have a height equal to that of the tooth members 30A and 47A.

FIGURE 6 is a partial cross-sectional view illustrating the use of the flexible band 63 and the manner in which it is joined when positioned between outer and inner pipe members 61 and 62. The body portion 66 is wrapped around the inner pipe and the tongue-and-groove portions 11A and 12A are interconnected in substantially the same manner as described above by forcibly inserting the tongue 26A within the groove. In this manner, the band 63 is snugly held on the external periphery of the inner pipe 62. The ribs 67 are provided so as to provide for proper bearing engagement between the outer and inner pipes 61 and 62, the ribs being of a height so as to have a substantial bearing engagement with the inner surface of the outer pipe 61 as shown in FIGURE 6.

While the foregoing example has utilized a single body member with the joint structure being formed on opposite ends thereof, it will be recognized that the joint will be equally applicable to joining any two separate and diverse members without changing either the principle of the invention or the apparatus required for carrying it out.

Although a particular embodiment of the invention has been herein above described in detail for illustrative purposes, it will be recognized that variations or modifications of such disclosure are fully contemplated.

The embodiments of the invention in which an exclusive property or privilege is claimed are defined as follows:

I claim:

1. An improved joint structure for interconnecting first and second portions, comprising:
   a tongue attached to one of said portions;
   a groove formed in another of said portions, said tongue being adapted to be received within said groove so as to interconnect said portions;
   lock means attached to said portions and adapted to interfit so as to interconnect said portions and prevent relative movement therebetween in a first direction parallel to said groove, said lock means being independent of said tongue-and-groove interconnection;
   said lock means including a plurality of teeth laterally spaced along the edge of one portion and a plurality of teeth laterally spaced along the edge of the other portion;
   a plurality of recesses formed in said other portion interspaced between the teeth thereon, each of said recesses being formed by a pair of parallel confronting end walls on adjacent teeth and by a pair of parallel sidewalls formed within said other portion, said recesses opening outwardly in a direction transverse to said tongue, said teeth on said one portion being received within said recesses on said other portion with the outer surfaces of said teeth being positioned closely adjacent said end walls and said sidewalls for preventing relative movement between said portions.

2. A joint structure according to claim 1 in which the teeth on said portions are provided with coaxially aligned openings therethrough, the openings extending in a direction parallel to said groove, all of said openings being coaxially aligned when the teeth of said one portion are received within the recesses of said other portion, and a pin adapted to be slideably received within said openings so as to fixedly interconnect teeth of said portions so as to prevent separation thereof.

3. A joint structure according to claim 1 in which said tongue comprises a flange portion extending from the end of said one portion and an enlarged head formed on the end of said flange, and said groove comprising a slot extending along the edge of said other portion, the inner end of said slot terminating in an enlarged opening for receiving the enlarged head of said tongue.

4. An improved joint structure for interconnecting first and second portions, comprising:
   a tongue attached to one of said portions;
   a groove formed in another of said portions, said tongue being adapted to be received within said groove so as to interconnect said portions;
   lock means attached to said portions and adapted to interfit so as to interconnect said portions and prevent relative movement therebetween in a first direction parallel to said groove, said lock means being independent of said tongue-and-groove interconnection;
   said lock means including teeth formed on said portions with said teeth being positioned so as to fit between each other when said portions are joined together; and
   said tongue and groove and said teeth being integrally formed on their respective portions and said portions being made of a flexible material whereby said teeth and said tongue and groove are capable of a limited amount of flexible movement relative to the remainder of said portions.

5. A joint structure according to claim 4 in which said teeth on said portions are each formed with an opening therethrough, the openings in said teeth being coaxially aligned when said teeth are interfitted with each other, and a pin adapted to be slideably received through said coaxially aligned openings so as to fixedly interlock said teeth together to prevent separation of said portions.

6. An improved joint structure for interconnecting first and second portions, comprising:
   tongue-and-groove means for permitting said first and second portions to be securely connected, said tongue-and-groove means including a tongue attached to said first portion and a groove formed in said second portion with said tongue being adapted to be received within said groove, said tongue including a flange portion extending from said first portion and an enlarged head formed on the end of said flange, said groove comprising a slot extending along the edge of said second portion with the inner end of said slot terminating in an enlarged opening for receiving the head of said tongue therein;
   lock means attached to said portions and adapted to interfit so as to connect said portions and prevent relative movement therebetween in a direction substantially parallel to the lengthwise extending direction of said groove, said lock means being independent of said tongue-and-groove means, said lock means comprising a plurality of first teeth on said first portion and laterally spaced apart in a direction lengthwise of said tongue, said first teeth being offset sidewardly from said tongue and having end walls projecting transversely thereto, a plurality of second teeth on said second portion and laterally spaced apart in a direction lengthwise of said groove, said second teeth extending sidewardly beyond the outer end of said slot and having end walls projecting transversely thereto, said teeth being arranged so that said first teeth snugly fit between and their end walls are engaged by the end walls of the second teeth so as to prevent any relative movement between said portions in a direction substantially parallel to the lengthwise extending direction of said groove.

7. A joint structure according to claim 6, further including a flexible flange integrally connecting said teeth to the edge of said second portion so as to permit said teeth to be flexibly moved a limited amount in a plane substantially transverse to the lengthwise extending direction of said groove.

References Cited

UNITED STATES PATENTS

| 390,421 | 10/1888 | West | 287—20.92 |
| 2,141,035 | 12/1938 | Daniels | 52—591 |
| 2,680,698 | 6/1954 | Schnee | 52—591 |
| 2,791,807 | 5/1957 | Morin | 287—20.92 X |
| 2,805,852 | 9/1957 | Malm | 52—591 |

FOREIGN PATENTS

| 585,506 | 1947 | England. |
| 812,671 | 1959 | England. |

CARL W. TOMLIN, Primary Examiner

W. L. SHEDD, Assistant Examiner

U.S. Cl. X.R.

52—585, 586; 287—127